United States Patent
Abboud et al.

(10) Patent No.: US 9,745,456 B2
(45) Date of Patent: Aug. 29, 2017

(54) MATT WEATHER-RESISTANT MOLDING MASSES FOR EXTRUSION METHODS

(71) Applicant: INEOS STYROLUTION GROUP GMBH, Frankfurt am Main (DE)

(72) Inventors: Mohammed Abboud, Royal Oak, MI (US); Rolf Minkwitz, Mannheim (DE); Davy Roger Suwier, Mannheim (DE); Philipp Boeckmann, Bad Duerkheim (DE); Hans-Juergen Hausser, Kaiserslautern (DE)

(73) Assignee: INEOS STYROLUTION GROUP GMBH (DE)

( * ) Notice: Subject to any disclaimer, the term of this patent is extended or adjusted under 35 U.S.C. 154(b) by 58 days.

(21) Appl. No.: 14/777,004

(22) PCT Filed: Mar. 13, 2014

(86) PCT No.: PCT/EP2014/054979
§ 371 (c)(1),
(2) Date: Sep. 15, 2015

(87) PCT Pub. No.: WO2014/146970
PCT Pub. Date: Sep. 25, 2014

(65) Prior Publication Data
US 2016/0032093 A1 Feb. 4, 2016

(30) Foreign Application Priority Data
Mar. 19, 2013 (EP) .................... 13159855

(51) Int. Cl.
| | |
|---|---|
| *C08L 25/12* | (2006.01) |
| *B32B 27/08* | (2006.01) |
| *B32B 27/30* | (2006.01) |
| *C08L 51/00* | (2006.01) |
| *B32B 37/14* | (2006.01) |
| *C08J 3/00* | (2006.01) |
| *C08J 3/20* | (2006.01) |
| *C08L 51/04* | (2006.01) |

(52) U.S. Cl.
CPC .............. *C08L 25/12* (2013.01); *B32B 27/08* (2013.01); *B32B 27/302* (2013.01); *B32B 27/304* (2013.01); *B32B 27/308* (2013.01); *B32B 37/14* (2013.01); *C08J 3/005* (2013.01); *C08J 3/203* (2013.01); *C08L 51/003* (2013.01); *C08L 51/04* (2013.01); *B32B 2250/02* (2013.01); *B32B 2250/246* (2013.01); *B32B 2264/0207* (2013.01); *B32B 2264/12* (2013.01); *B32B 2270/00* (2013.01); *B32B 2307/712* (2013.01); *B32B 2419/00* (2013.01); *C08J 2325/12* (2013.01); *C08J 2451/00* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 4,224,419 A | 9/1980 | Swoboda et al. | |
| 4,605,699 A | 8/1986 | Mitulla et al. | |
| 4,634,734 A | 1/1987 | Hambrecht et al. | |
| 4,753,988 A * | 6/1988 | Henton ................. | C08L 25/12 |
| | | | 525/193 |
| 4,788,253 A | 11/1988 | Hambrecht et al. | |
| 5,196,480 A | 3/1993 | Seitz et al. | |
| 5,346,954 A | 9/1994 | Wu et al. | |
| 5,438,099 A | 8/1995 | Fischer et al. | |
| 5,821,302 A | 10/1998 | Rosenau et al. | |
| 5,883,187 A * | 3/1999 | Chang .................... | C08L 55/02 |
| | | | 525/71 |
| 2003/0181583 A1 | 9/2003 | Duijzings et al. | |
| 2004/0006178 A1 | 1/2004 | Nagahara et al. | |
| 2006/0148992 A1 | 7/2006 | Kim et al. | |
| 2010/0107530 A1* | 5/2010 | Pietruczynik ....... | B29C 47/0028 |
| | | | 52/313 |

FOREIGN PATENT DOCUMENTS

| | | |
|---|---|---|
| DE | 1260135 B | 2/1968 |
| DE | 2826925 A1 | 1/1980 |
| DE | 3149357 A1 | 6/1983 |
| DE | 3149358 A1 | 6/1983 |
| DE | 3227555 A1 | 1/1984 |
| DE | 3414118 A1 | 10/1985 |
| DE | 4242485 A1 | 6/1994 |
| DE | 19536892 A1 | 4/1997 |
| DE | 19802110 A1 | 7/1999 |
| EP | 0450485 A2 | 10/1991 |
| EP | 1044241 B1 | 8/2004 |
| GB | 1124911 A | 8/1968 |
| WO | 99/33914 A2 | 7/1999 |

(Continued)

OTHER PUBLICATIONS

International Search Report for PCT/EP2014/054979 dated Dec. 5, 2014.
International Preliminary Report on Patentability for PCT/EP2014/054979 dated Sep. 22, 2015.
Vandegaer, "Latex growth," J. Applied Polymer Science 9(9):2929-2938 (1965).

(Continued)

*Primary Examiner* — Jeffrey Mullis
(74) *Attorney, Agent, or Firm* — J.A. Lindeman & Co., PLLC

(57) ABSTRACT

The invention relates to thermoplastic compositions, containing the following components: a) 30 to 90 wt % of one or more styrene copolymers, and acrylonitrile, as component A; b) 10 to 70 wt % of several impact-modifying graft rubbers without an olefinic double bond in the rubber phase as component B, wherein said component B contains: B1) 1 to 50 wt % of rubber particles that have an average particle diameter of 50 to 150 nm as component B I; B2) 50 to 99 wt % of rubber particles that have an average particle diameter of 800 to 1200 nm as component B2; c) 0 to 20 wt % of one or more additives as component C; are especially weather-resistant and have good mechanical properties.

19 Claims, No Drawings

(56) References Cited

FOREIGN PATENT DOCUMENTS

| WO | 99/37699 A1 | 7/1999 |
| WO | 02/10222 A1 | 2/2002 |

OTHER PUBLICATIONS

English-language abstract of DE 3149357 from Espacenet.
English-language abstract of DE 19802110 from Espacenet.

* cited by examiner

MATT WEATHER-RESISTANT MOLDING MASSES FOR EXTRUSION METHODS

The present invention relates to thermoplastic molding compounds comprising at least one styrene copolymer and impact-modifying graft rubbers (without olefinic double bonding in the rubber phase). These molding compounds are matt and particularly weathering-resistant and are suitable for various processing methods, particularly extrusion.

Stabilized matt styrene copolymers comprising impact-modifying graft rubber without olefinic double bonding are known and widely useable for diverse exterior applications on account of their good weathering resistance.

For example, EP-A 1 044 241 discloses stabilized styrene copolymers comprising impact-modifying graft rubber where matting is achieved by crystalline polyalkylene terephthalates, polyalkylene naphthalates or polyamides. However, the disadvantage of this embodiment is poor multi-axial toughness.

DE-A 195 36 892 cites matting agents in styrene copolymers based on butadiene, polyalkyl methacrylates and butyl acrylates. These have an average particle size of >700 nm, preferably >3 μm, more preferably >4 μm. These particles have limited colorability and do not have high multi-axial toughness.

DE-A 198 02 110 describes alkyl acrylate rubbers that are produced in microsuspension and have a particle diameter of from 0.08 to 100 μm. The microsuspension produces rubbers that are too large and it may introduce discoloring protective colloids and residues of oil-soluble initiators into the product.

U.S. Pat. No. 5,346,954 describes core-shell particles made of alkyl acrylates having a refractive index that differs from the refractive index of the polymer matrix by 0.2 units and having an average diameter of 2-15 μm. These particles have poor toughness and poor colorability on account of their particle size.

DE-A 42 42 485 describes hydroxy(meth)acrylate rubbers of from 30 to 1000 nm in size which, on account of the hydroxy groups, may exhibit a certain incompatibility with the polymer matrix which can result in a drop in toughness.

It is an object of the present invention to provide matt, weathering-resistant molding compounds based on acrylonitrile/styrene/acrylic esters (ASA) exhibiting good colorability and a high level of toughness.

The invention relates to a thermoplastic composition comprising (or composed of) the following components:
a) 30 to 90 wt % of one or more styrene copolymers composed of styrene and/or α-methylstyrene and/or N-phenylmaleimide and of acrylonitrile and optionally further monomers, as component A;
b) 10 to 70 wt % of a plurality of impact-modifying graft rubbers without olefinic double bonding in the rubber phase, as component B, wherein said component B comprises:
B1) 1 to 50 wt % of rubber particles having an average particle diameter of from 50 to 150 nm, as component B1;
B2) 50 to 99 wt % of rubber particles having an average particle diameter of from 800 to 1200 nm, as component B2;
c) 0 to 20 wt % of one or more added substances distinct from components A, B1 and B2, as component C;
with the proviso that the weight percent values are in each case based on the total weight of the components A to C and said components altogether sum to 100 wt %.

The invention further provides a thermoplastic composition for which the following components are employed:
a) 50 to 80 wt % of one or more styrene copolymers composed of styrene and/or α-methylstyrene and of acrylonitrile, as component A;
b) 20 to 50 wt % of a plurality (often two or three) of impact-modifying graft rubbers without olefinic double bonding in the rubber phase, as component B, where said component B comprises:
B1) 10 to 50 wt % of rubber particles having an average particle diameter of from 50 to 150 nm, as component B1;
B2) 50 to 90 wt % of rubber particles having an average particle diameter of from 800 to 1200 nm, as component B2;
c) 0 to 20 wt % of one or more added substances distinct from components A, B1 and B2, as component C.

The invention further provides a thermoplastic composition for which the following components are employed:
a) 50 to 80 wt % of one or more styrene copolymers composed of styrene and/or α-methylstyrene and of acrylonitrile, as component A;
b) 20 to 50 wt % of a plurality of impact-modifying graft rubbers without olefinic double bonding in the rubber phase, as component B, where said component B comprises:
B1) 10 to 50 wt % of rubber particles having an average particle diameter of from 80 to 120 nm, as component B1;
B2) 50 to 90 wt % of rubber particles having an average particle diameter of from 900 to 1200 nm, as component B2;
c) 0 to 20 wt % of one or more added substances distinct from components A, B1 and B2, as component C.

The invention further provides a thermoplastic composition, wherein the component A employed is a styrene copolymer composed of:
55 to 90 wt % of styrene and/or a-methylstyrene, in particular styrene,
10 to 45 wt % of acrylonitrile,
0 to 10 wt % of further monomers,
with the proviso that the weight percent values are in each case based on the total weight of the component A. Component A is often a SAN matrix composed of 65 wt % of styrene and 35 wt % of acrylonitrile.

The invention further provides a thermoplastic composition, wherein the component A employed is a copolymer composed of styrene and acrylonitrile and the component B1 employed is an acrylate-styrene-acrylonitrile (ASA) graft copolymer which comprises as the polymeric substrate (graft base) an acrylic ester polymer B11 and which comprises a polymeric superstrate (graft sheath) B12, wherein the superstrate is formed from a vinylaromatic monomer (often styrene) and a polar, copolymerizable, ethylenically unsaturated monomer (often acrylonitrile).

The invention further provides a thermoplastic composition, wherein the component B2 employed is an acrylate-styrene-acrylonitrile (ASA) graft copolymer which comprises as the polymeric substrate an acrylic ester polymer B21 and which comprises at least three different polymeric superstrates B22, B23 and B24, wherein the one superstrate is formed from a vinylaromatic monomer (often styrene) and optionally a polar, copolymerizable, ethylenically unsaturated monomer (often acrylonitrile) and the other superstrate is formed from at least one acrylate monomer and a third superstrate is formed from a vinylaromatic monomer (often styrene) and at least one polar, copolymerizable, ethylenically unsaturated monomer (often acrylonitrile).

The invention further provides a thermoplastic composition, wherein the graft rubber component B1 is produced by emulsion polymerization.

The invention further provides a thermoplastic composition, wherein the graft rubber component B2 is produced by emulsion polymerization.

The invention further provides a thermoplastic composition, wherein the component B1 is present in an amount of from 10 to 20 wt % (often from 14 to 20 wt %) and the component B2 is present in an amount of from 10 to 40 wt % (often from 15 to 25 wt %), in each case based on the total weight of the components A to C.

The invention further provides a thermoplastic composition, wherein the average particle diameter of the graft rubber component B1 is between 90 to 110 nm.

The invention further provides a thermoplastic composition, wherein the average particle diameter of the graft rubber component B2 is between 950 to 1100 nm.

The invention further provides a thermoplastic composition, wherein both graft rubber components B1 and B2 employ as the substrate an alkyl acrylate comprising $C_1$ to $C_8$ alkyl radicals, in particular butyl acrylate, and at least one monomer which has cross-linking properties and is selected from the group:

butylene diacrylate, divinylbenzene, butainediol dimethacrylate, trimethylolpropane tri(meth)acrylate, diallyl methacrylate, diallyl maleate, diallyl fumarate, triallyl methacrylate, Manyl isocyanurate, diallyl phthalate, allyl methacrylate and dihydrodicyclopentadienyl acrylate. Allyl methacrylate (AMA) or dihydrodicyclopentadienyl acrylate (DCPA) are often used.

The invention further provides a thermoplastic composition, wherein styrene is employed as the vinylaromatic component for the first polymeric superstrate B22 or the second polymeric superstrate B23 and wherein an alkyl acrylate comprising $C_1$ to $C_8$ alkyl radicals, in particular butyl acrylate, and at least one monomer which has crosslinking properties and is selected from the group:

butylene diacrylate, divinylbenzene, butainediol dimethacrylate, trimethylolpropane tri(meth)acrylate, diallyl methacrylate, diallyl maleate, diallyl fumarate, triallyl methacrylate, Manyl isocyanurate, diallyl phthalate, allyl methacrylate and dihydrodicyclopentadienyl acrylate, are employed for the first polymeric superstrate B22 or the second polymeric superstrate B23, and optionally the monomers styrene and acrylonitrile are employed for a third polymeric superstrate B24 of B2.

The invention further provides a thermoplastic composition, wherein the graft rubber component B2 employed is an acrylate-styrene-acrylonitrile (ASA) graft polymer comprising as the polymeric substrate a polymer B21 composed of butyl acrylate and of a monomer which has crosslinking properties and is selected from the group:

butylene diacrylate, divinylbenzene, butainediol dimethacrylate, trimethylolpropane tri(meth)acrylate, diallyl methacrylate, diallyl maleate, diallyl fumarate, triallyl methacrylate, Manyl isocyanurate, diallyl phthalate, allyl methacrylate and dihydrodicyclopentadienyl acrylate, and at least three different polymeric superstrates B22, B23 and B24, wherein the first of these superstrates is constructed from styrene and a monomer which has cross-linking properties and is selected from the abovementioned group (in particular AMA or DCPA) and the second of these superstrates is constructed from butyl acrylate and a monomer which has crosslinking properties and is selected from the abovementioned group (in particular AMA or DCPA) and the third of these superstrates is constructed from styrene and acrylonitrile.

The invention further provides a thermoplastic composition, wherein the employed weight ratio of graft rubber component B1 to graft rubber component B2 is from 2:1 to 1:2 (often from 1.5:1 to 1:1.5) and the employed weight ratio of styrene copolymer component A to graft rubber component B1 is from 4:1 to 4:3.

The invention further provides a process for producing a thermoplastic composition as described hereinabove, characterized in that it comprises producing the styrene copolymer components A by solution polymerization or bulk polymerization, producing the graft copolymer components B by emulsion polymerization, and mixing the components A and B and optionally C with one another in any desired order at temperatures of from 100° C. to 300° C. and a pressure of from 1 to 50 bar and then extruding the mixture.

The invention further provides for the use of a thermoplastic composition as described hereinabove for producing films/sheets, molded bodies or composite articles. The invention also provides the films/sheets, molded bodies or composite articles comprising a thermoplastic composition of this type.

The invention further provides a process for producing composite articles from at least one layer composed of a thermoplastic composition as described hereinabove and at least one layer made of PVC or ABS.

The invention further provides a composite article composed of at least one layer made of a thermoplastic composition as described hereinabove and at least one layer made of PVC or ABS. These PVC and ABS copolymer layers may employ commercially available materials. The invention further provides for the use of these composite articles for architectural claddings, in particular exterior claddings.

The components are more particularly elucidated hereinbelow as is the production thereof.

Component A:

As component A the thermoplastic molding compounds according to the invention comprise one or more styrene copolymers. In addition to styrene the copolymers may comprise any desired suitable comonomers. Component A is preferably a styrene acrylonitrile copolymer, an alpha-methylstyrene acrylonitrile copolymer or an N-phenyl maleimide acrylonitrile copolymer. Component A is more preferably a styrene acrylonitrile copolymer (SAN).

The component A may in principle be any styrene-acrylonitrile copolymers, α-methylstyrene-acrylonitrile copolymers, N-phenylmaleimide-acrylonitrile copolymers or mixtures thereof that are known to those skilled in the art and described in the literature provided the mixtures thereof have a viscosity number VN (measured according to DIN 53727 at 25° C. as a 0.5 wt % solution in dimethylformamide; this measuring method is also used for any viscosity numbers VN cited hereinbelow) of not more than 85 ml/g.

Preferred components A are constructed from 50 to 90 wt %, preferably 60 to 85 wt %, in particular 65 to 83 wt %, of styrene and 10 to 50 wt %, preferably 15 to 40 wt %, in particular 17 to 35 wt %, of acrylonitrile and also 0 to 5 wt %, preferably 0 to 4 wt %, in particular 0 to 3 wt %, of further monomers, where the wt % values are in each case based on the weight of component A and sum to 100 wt %. Component A is often a SAN copolymer without further monomers.

Further preferred components A are constructed from 50 to 90 wt %, preferably 60 to 80 wt %, in particular 65 to 78 wt %, of α-methylstyrene and 10 to 50 wt %, preferably 20 to 40 wt %, in particular 22 to 35 wt %, of acrylonitrile and also 0 to 5 wt %, preferably 0 to 4 wt %, in particular 0 to 3 wt %, of further monomers, wherein the wt % values are in each case based on the weight of component A and sum to 100 wt %.

Likewise preferred components A are mixtures of these styrene-acrylonitrile copolymers and α-methylstyrene-acrylonitrile copolymers with N-phenylmaleimide-styrene copolymers or N-phenylmaleimide-styrene-acrylonitrile terpolymers.

The abovementioned further monomers may be any copolymerizable monomers, for example p-methylstyrene, t-butylstyrene, vinylnaphthalene, alkyl acrylates and/or alkyl methacrylates, for example those comprising $C_1$ to $C_8$ alkyl radicals, N-phenylmaleimide and mixtures thereof.

The copolymers of component A may be produced by known methods. Said copolymers may be produced, for example, by radical polymerization, in particular by emulsion, suspension, solution or bulk polymerization. Said copolymers have viscosity numbers in the range of from 40 to 160 ml/g which corresponds to average molecular weights Mw (weight-average value) of from 40 000 to 2 000 000 g/mol. The $M_w$ value for the SAN matrix is often in the range of from 40 000 to 300 000 g/mol.

Component B:

The component B is composed of at least two different elastomeric graft copolymers of vinylaromatic compounds, in particular styrene, and vinyl cyanides, in particular acrylonitrile, on polyalkylacrylate rubbers.

In one preferred embodiment, the elastomeric graft copolymer B is constructed from two components B1 and B2.

The component B1 (small particle size) is, for example, constructed from:

B-11 1 to 99 wt %, preferably 55 to 80 wt %, in particular 55 to 65 wt %, of a particulate graft substrate B11 having a glass transition temperature below 0° C., B-12 1 to 99 wt %, preferably 20 to 45 wt %, in particular 35 to 45 wt %, of a graft superstrate B12 made of the monomers, based on B.

Component B11 is constructed from:

B-111 60 to 99.98 wt %, preferably 80 to 99.9 wt %, of at least one C1-8 alkyl ester of acrylic acid, preferably C4 to C8 alkyl acrylates, in particular n-butyl acrylate and/or 2-ethylhexyl acrylate, as component B-111, B-112 0.01 to 20 wt %, preferably 0.1 to 5 wt %, of at least one polyfunctional crosslinking monomer, preferably butylene diacrylate, divinylbenzene, butainediol dimethacrylate, trimethylolpropane tri(meth)acrylate, diallyl methacrylate, diallyl maleate, diallyl fumarate, triallyl methacrylate, triallyl isocyanurate, more preferably diallyl phthalate, allyl methacrylate ("AMA") and/or dihydrodicyclopentadienyl acrylate ("DCPA"), as component C-112, and B-113 0 to 39.99 wt %, preferably 0 to 19.9 wt %, of hard-polymer-forming monomers, such as vinyl acetate, (meth)acrylonitrile, styrene, substituted styrene, methyl methacrylate or vinyl ether, as component B-113.

Component B12 is constructed from:

B-121 40 to 100 wt %, preferably 65 to 85 wt % of a vinylaromatic monomer, in particular of styrene, α-methylstyrene or N-phenylmaleimide, as component B-121 and B-122 0 to 60 wt %, preferably 15 to 35 wt % of a polar, copolymerizable, ethylenically unsaturated monomer, in particular acrylonitrile, (meth)acrylic esters or methacrylonitrile, as component B-122.

The component B1 is a graft copolymer comprising a graft substrate B11 and at least one graft superstrate B12. The graft copolymer B1 may have a more or less perfectly developed core-shell construction (graft substrate B11 is the core, graft superstrate B12 is the shell), but it is also possible for the graft superstrate B12 to enclose/cover the graft substrate B11 only incompletely or alternatively for the graft superstrate B12 to completely or partially penetrate the graft substrate B11.

It is also possible to employ two or more graft substrates B11 that differ from one another in their composition or in particle size for example. Such mixtures of different graft substrates may be produced by methods known per se to those skilled in the art, for example by producing two or more rubber latices separately, mixing the corresponding dispersions, precipitating the moist rubbers separately from the corresponding dispersions and mixing them in an extruder for example or by performing the entire work-up of the corresponding dispersions separately and then mixing the graft substrates obtained.

The graft copolymer B1 may comprise between graft substrate B11 and graft superstrate B12 one or more further graft superstrates/graft sheaths or shells, for example having different monomer compositions. However, it is preferable when the graft copolymer B1 comprises no further graft superstrates/graft sheaths or shells other than the graft superstrate B12.

The polymer of the graft substrate B11 typically has a glass transition temperature below 0°, preferably a glass transition temperature below (−20)° C., in particular below (−30)° C. A polymer composed of the monomers forming graft superstrate B12 typically has a glass transition temperature of more than 30° C., in particular more than 50° C. (in each case determined according to DIN 53765).

The graft copolymers B1 typically have an average particle size d50 of from 50 to 150 nm, particularly preferably 80 to 120 nm. These particle sizes can be achieved by using average particle sizes d50 of from 45 to 190 nm, preferably from 50 to 140 nm, more preferably from 75 to 110 nm, as grafting base B1. In accordance with one embodiment of the invention the particle size distribution of B1 is monomodal. The average particle sizes/particle size distributions reported are the sizes determined from the integral mass distribution. These average particle sizes and the further average particle sizes cited in the context of the present invention are in all cases the weight averages of the particle sizes as determined by HDC (see W. Wohlleben and H. Schuch in "Measurement of Particle Size Distribution of Polymer Latexes", 2010, Editors: Luis M. Gugliotta and Jorge R. Vega, pp. 130 to 153).

The graft copolymers B1 are preferably produced by free-radical emulsion polymerization in the presence of latices of the component B11 at temperatures of from 20° C. to 90° C. using water-soluble or oil-soluble initiators such as peroxodisulfate or benzyl peroxide, or with the aid of redox initiators. Redox initiators are also suitable for polymerization below 20° C.

Suitable polymerization processes are described in WO-02/10222, DE-A-28 26 925, DE-A-31 49 358 and DE-C-12 60 135. The graft superstrates are preferably constructed by the emulsion polymerization process described in DE-A-32 27 555, DE-A-31 49 357, DE-A-31 49 358, DE-A-34 14 118. The defined adjustment of the average particle sizes to from 50 to 200 nm, in particular 50 to 150 nm, is preferably made by the processes described in DE-C-12 60 135 and DE-A-28 26 925 and Applied Polymer Science, volume 9 (1965), page 2929.

The use of polymers having different particle sizes is known, for example, from DE-A-28 26 925 and U.S. Pat. No. 5,196,480. The process described in DE-B-12 60 135 comprises initially producing the graft substrate B11 by polymerizing the acrylic ester(s) B-111 used according to one embodiment of the invention and the compound B-112 which acts as a crosslinking and/or grafting agent, optionally together with the further monoethylenically unsaturated monomers B-113, in an aqueous emulsion in a manner known per se at temperatures between 20° C. and 100° C., preferably between 50° C. and 90° C.

The customary emulsifiers may be used, examples being alkali metal salts of alkyl- or alkylaryl sulfonic acids, alkyl sulfates, fatty alcohol sulfonates, salts of higher fatty acids comprising 10 to 30 carbon atoms or resin soaps. Preference is given to using sodium salts of alkyl sulfonates or fatty acids comprising 10 to 18 carbon atoms. In accordance with one embodiment the emulsifiers are employed in amounts of from 0.5 to 5 wt %, in particular from 0.7 to 2 wt %, based on the monomers employed in the preparation of graft substrate B11. The weight ratio of water to monomers is generally in the range of from 4:1 to 0.6:1. Useful polymerization initiators include in particular the commonly used persulfates, for example potassium persulfate (UPs). However, it is also possible to use redox systems.

The initiators are generally employed in amounts of from 0.1 to 1 wt % based on the monomers used in the production of the graft substrate B11. Further polymerization assistants that may be used in the polymerization include the customary buffer substances used to adjust the pH to the preferred range of from 6 to 9, such as sodium bicarbonate and sodium pyrophosphate, and also from 0 to 3 wt % of a molecular weight regulator, such as mercaptans, terpinols or dimeric α-methylstyrene. The precise polymerization conditions, in particular emulsifier type, feed modus and quantity, are specifically determined within the above-specified ranges such that the obtained latex of the crosslinked acrylic ester polymer B11 has a d50 value in the range of from 50 to 200 nm, preferably from 50 to 150 nm, more preferably from 80 to 120 nm. The particle size distribution of this latex shall preferably be narrow, with a polydispersity index <0.75, in line with W. Machtle and L. Börger, Analytical Ultracentrifugation of Polymers and Nanoparticles, (Springer, Berlin, 2006, ISBN 3-540-23432-2).

To form the graft polymer B1, one embodiment of the invention may comprise a subsequent step wherein in the presence of the thus obtained latex of the crosslinked acrylic ester polymer B11 a monomer mixture of component B-121, preferably styrene, component B-122, preferably acrylonitrile and/or a (meth)acrylic ester, and optionally further unsaturated monomers is polymerized. Monomers B-121, B-122 and optionally further unsaturated monomers may be added to this polymerization individually or in admixture with one another. For example it is possible to initially graft styrene alone and subsequently graft a mixture of styrene and acrylonitrile. It is advantageous to again carry out this graft copolymerization onto the crosslinked acrylic ester polymer serving as the graft substrate in aqueous emulsion under the customary conditions as described above. The graft copolymerization may advantageously be performed in the same system as the emulsion polymerization for producing graft substrate B11 and further emulsifier and initiator may be added if necessary. The monomer mixture to be grafted onto the graft substrate according to one embodiment of the invention may be added to the reaction mixture all at once, batchwise in a plurality of stages (for example to construct a plurality of graft superstrates) or preferably in continuous fashion during the polymerization.

The graft copolymerization of the mixture of the components B-121, B-122 and optionally further monomers in the presence of the crosslinked acrylic ester polymer B11 is conducted such that a degree of grafting of from 10 to 70 wt %, preferably 20 to 60 wt %, in particular in 30 to 55 wt %, based on the total weight of component B1, is achieved in graft copolymer B1. Since the graft yield for the graft copolymerization is often less than 100%, a somewhat larger amount of the monomer mixture of B-121, B-122 and optionally further monomers should advantageously be used for the graft copolymerization than corresponds to the desired degree of grafting. Controlling the graft yield in the graft copolymerization and thus the degree of grafting of the finished graft copolymer B1 is familiar to those skilled in the art and may, for example, be accomplished inter alia via the feed rate of the monomers or via addition of regulators (Chauvel, Daniel, ACS Polymer Preprints 15 (1974), pages 329 to 333). The emulsion graft copolymerization generally affords from 5 to 15 wt %, based on the graft copolymer, of free, ungrafted copolymer of the components B-121, B-122 and optionally of the further monomers. The proportion of the graft copolymer B1 in the polymerization product obtained in the graft copolymerization may be determined, for example, by the method described in US 2004/0006178.

The component B2 (large particle size) is, for example, constructed from:

B-21 0.05 to 0.9 wt %, preferably 0.05 to 0.5 wt %, in particular 0.1 to 0.3 wt %, of a particulate substrate B21 having a glass transition temperature below 0° C., B-22 1 to 9 wt %, preferably 1 to 7 wt %, in particular 3 to 5 wt %, of a particulate shell B22 applied to B21, B-23 80 to 45 wt %, preferably 75 to 50 wt %, in particular 70 to 55 wt %, of a particulate shell B23 applied to B22, B-24 1 to 99 wt %, preferably 20 to 45 wt %, in particular 35 to 45 wt % of a graft superstrate B24 having a glass transition temperature below 0° C. made of the monomers, based on B.

The component B-21 therein is constructed from:

B-211 60 to 99.98 wt %, preferably 80 to 99.9 wt %, of at least one C1-8 alkyl ester of acrylic acid, preferably C4 to C8 alkyl acrylates, in particular n-butyl acrylate and/or 2-ethylhexyl acrylate, as component B-211, B-212 0.01 to 20 wt %, preferably 0.1 to 5 wt %, of at least one polyfunctional crosslinking monomer, preferably butylene diacrylate, divinylbenzene, butainediol dimethacrylate, trimethylolpropane tri(meth)acrylate, diallyl methacrylate, diallyl maleate, diallyl fumarate, triallyl methacrylate, triallyl isocyanurate, more preferably diallyl phthalate, allyl methacrylate ("AMA") and/or dihydrodicyclopentadienyl acrylate ("DCPA"), as component B-212, B-213 0 to 39.99 wt %, preferably 0 to 19.9 wt %, of hard-polymer-forming monomers, such as vinyl acetate, (meth)acrylonitrile, styrene, substituted styrene, methyl methacrylate or vinyl ether, as component B-213.

The component B-22 therein is constructed either from

B-221 60 to 99.98 wt %, preferably 80 to 99.9 wt %, of monomers forming "hard polymers", such as vinyl acetate, (meth)acrylonitrile, styrene, substituted styrene, methyl methacrylate or vinyl ether, as component B-221, B-222 0.01 to 20 wt %, preferably 0.1 to 5 wt %, of at least one polyfunctional crosslinking monomer, preferably butylene diacrylate, divinylbenzene, butainediol dimethacrylate, trimethylolpropane tri(meth)acrylate, diallyl methacrylate, diallyl maleate, diallyl fumarate, triallyl methacrylate, triallyl isocyanurate, more preferably diallyl phthalate, allyl methacrylate ("AMA") and/or dihydrodicyclopentadienyl acrylate ("DCPA"), as component B-222, B-223 0 to 39.99 wt %, preferably 0 to 19.9 wt %, of at least one C1-8 alkyl ester of acrylic acid, preferably C4 to C8 alkyl acrylates, in particular n-butyl acrylate and/or 2-ethylhexyl acrylate, as component B-211, or constructed from B-224 60 to 99.98 wt %, preferably 80 to 99.9 wt %, of at least one C1-8 alkyl ester of acrylic acid, preferably C4 to C8 alkyl acrylates, in particular n-butyl acrylate and/or 2-ethylhexyl acrylate, as component B-224, B-225 0.01 to 20 wt %, preferably 0.1 to 5 wt %, of at least one polyfunctional crosslinking monomer, preferably butylene diacrylate, divinylbenzene, butainediol dimethacrylate, trimethylolpropane tri(meth)acrylate, diallyl methacrylate, diallyl maleate, diallyl fumarate, triallyl methacrylate, triallyl isocyanurate, more preferably diallyl phthalate, allyl methacrylate ("AMA") and/or dihydrodicyclopentadienyl acrylate ("DCPA"), as component B-225, B-226 0 to 39.99 wt %, preferably 0 to 19.9 wt %, of hard-polymer-forming monomers, such as vinyl acetate, (meth)acrylonitrile, styrene, substituted styrene, methyl methacrylate or vinyl ether, as component B-226.

The component B-23 therein is constructed from

B-234 60 to 99.98 wt %, preferably 80 to 99.9 wt %, of at least one C1-8 alkyl ester of acrylic acid, preferably C4 to C8 alkyl acrylates, in particular n-butyl acrylate and/or 2-ethylhexyl acrylate, as component B-224, B-235 0.01 to 20 wt %, preferably 0.1 to 5 wt %, of at least one polyfunctional crosslinking monomer, preferably butylene diacrylate, divinylbenzene, butainediol dimethacrylate, trimethylolpropane tri(meth)acrylate, diallyl methacrylate, diallyl maleate, diallyl fumarate, triallyl methacrylate, triallyl isocyanurate, more preferably diallyl phthalate, allyl methacrylate ("AMA") and/or dihydrodicyclopentadienyl acrylate ("DCPA"), as component B-225, B-236 0.01 to 39.99 wt %, preferably 0 to 19.9 wt %, of monomers that form "hard polymers", such as vinyl acetate, (meth)acrylonitrile, styrene, substituted styrene, methyl methacrylate or vinyl ether, as component B-226.

The component B-24 therein is constructed from:

B-241 40 to 100 wt %, preferably 65 to 85 wt %, of a vinylaromatic monomer, in particular of styrene, α-methylstyrene or N-phenylmaleimide, as component B-241 and B-242 0 to 60 wt %, preferably 15 to 35 wt % of a polar, copolymerizable, ethylenically unsaturated monomer, in particular acrylonitrile, (meth)acrylic esters or methacrylonitrile, as component B-242.

The component B2 is a graft copolymer comprising a seed (substrate) B21, a shell (superstrate) B22, a further shell B23 and a graft superstrate B24. The graft copolymer B2 may have a more or less perfectly developed core-shell construction (seed B21 is the core and B22, B23 and B24 are the shells), but it is also possible for one of the shells B22, B23 and B24 to enclose/cover the seed B21 or one of the preceding shells only incompletely or else for the graft superstrate B24 to completely or partially penetrate the graft substrates B21, B22 and B23.

It is also possible to employ two or more seed latices B21 that differ from one another in their composition or in particle size for example. Such mixtures of different seed latices may be produced by methods known per se to those skilled in the art, for example by producing two or more rubber latices separately and mixing the corresponding dispersions.

The same applies for the shells B22 and B23 which may differ from one another in their composition or in particle size for example. Such mixtures of different seed latices may be produced by methods known per se to those skilled in the art, for example by producing two or more rubber latices separately, mixing the corresponding dispersions, precipitating the moist rubbers B2 separately from the corresponding dispersions and mixing them in an extruder for example or by performing the entire work-up of the corresponding dispersions separately and then mixing the seed latices obtained.

The polymer of the seed B21 typically has a glass transition temperature below 0°, preferably a glass transition temperature below (−20)° C., in particular below (−30)° C. A polymer composed of the monomers forming graft superstrate B24 typically has a glass transition temperature of more than 30° C., in particular more than 50° C. (in each case determined according to DIN 53765).

The graft copolymers B2 are preferably produced by free-radical emulsion polymerization in the presence of latices of the component B21 at temperatures of from 20° C. to 120° C. using water-soluble or oil-soluble initiators such as peroxodisulfate or benzyl peroxide, or with the aid of redox initiators. Redox initiators are also suitable for polymerization below 20° C. Suitable polymerization processes are described in WO 02/10222, DE-A-28 26 925, DE-A-31 49 358 and DE-C-12 60 135. The graft superstrates are preferably constructed by the emulsion polymerization process described in DE-A-32 27 555, DE-A-31 49 357, DE-A-31 49 358, DE-A-34 14 118.

The use of polymers having different particle sizes is known, for example, from DE-A-28 26 925 and U.S. Pat. No. 5,196,480. The process described in DE-B-12 60 135 comprises initially producing the graft substrate B21 by polymerizing the acrylic ester(s) B-211 used according to one embodiment of the invention and the compound B-212 which acts as a crosslinking and/or grafting agent, optionally together with the further monoethylenically unsaturated monomers B-213, in an aqueous emulsion in a manner known per se at temperatures between 20° C. and 100° C., preferably between 50° C. and 90° C.

The customary emulsifiers cited above may be used, examples being alkali metal salts of alkyl- or alkylaryl sulfonic acids. Preference is given to using sodium salts of alkyl sulfonates or fatty acids comprising 10 to 18 carbon atoms. In accordance with one embodiment the emulsifiers are employed in amounts of from 0.5 to 5 wt %, in particular from 0.7 to 2 wt %, based on the monomers employed in the preparation of the graft substrate B21. The weight ratio of water to monomers is generally in the range of from 4:1 to 0.6:1. Suitable polymerization initiators include particularly the commonly used persulfates, for example potassium persulfate. However, it is also possible to use redox systems.

The initiators are generally employed in amounts of from 0.1 to 1 wt % based on the monomers used in the production of the graft substrate B21. Further polymerization assistants that may be used in the polymerization include the customary buffer substances used to adjust the pH to the preferred range of from 6 to 9, such as sodium bicarbonate and sodium pyrophosphate, and also from 0 to 3 wt % of a molecular weight regulator, such as mercaptans, terpinols or dimeric α-methylstyrene. The precise polymerization conditions, in particular emulsifier type, feed modus and quantity, are specifically determined within the above-specified ranges such that the obtained latex of the crosslinked acrylic ester polymer B21 has the desired d50 value. The particle size distribution of this latex shall preferably be narrow, with a polydispersity index <0.75.

The process described in DE-B-12 60 135 comprises subsequently producing a polymeric superstrate B22 by polymerizing the acrylic ester(s) B-224 or hard-polymerforming monomers B-221 used according to one embodiment of the invention and the compound B-222/B-225 which acts as a crosslinking and/or grafting agent, optionally together with the further monoethylenically unsaturated monomers B-223 or B-226, in an aqueous emulsion in a manner known per se at temperatures between 20° C. and 120° C., preferably between 50° C. and 110° C. The customary emulsifiers may be used, examples being alkali metal salts of alkyl- or alkylaryl sulfonic acids, alkyl sulfates, fatty alcohol sulfonates, salts of higher fatty acids comprising 10 to 30 carbon atoms or resin soaps. Preference is given to using the sodium salts of alkyl sulfonates or fatty acids having 10 to 18 carbon atoms. In accordance with one embodiment the emulsifiers are employed in amounts of from 0.5 to 5 wt %, in particular from 0.7 to 2 wt %, based on the monomers employed in the preparation of the substrate B21. The weight ratio of water to monomers is generally in the range of from 4:1 to 0.6:1. Suitable polymerization initiators include particularly the commonly used persulfates, for example potassium persulfate.

However, it is also possible to use redox systems. The initiators are generally employed in amounts of from 0.1 to 1 wt % based on the monomers used in the production of the substrate B21. Further polymerization assistants that may be used in the polymerization include the customary buffer substances used to adjust the pH to the preferred range of from 6 to 9, such as sodium bicarbonate and sodium pyrophosphate, and also from 0 to 3 wt % of a molecular weight regulator, such as mercaptans, terpinols or dimeric α-methylstyrene. The precise polymerization conditions, in particular emulsifier type, feed modus and quantity, are specifically determined within the above-specified ranges such that the obtained latex of the crosslinked acrylic ester polymer B22 has a d50 value in the range of from 250 to 500 nm, preferably from 300 to 400 nm, more preferably from 325 to 375 nm. The particle size distribution of this latex shall preferably be narrow, with a polydispersity index <0.75, in line with W. Machtle and L. Borger, Analytical Ultracentrifugation of Polymers and Nanoparticles, (Springer, Berlin, 2006, ISBN 3-540-23432-2).

The process described in DE-B-12 60 135 comprises subsequently producing a polymeric superstrate B23 by polymerizing the acrylic ester(s) B-235 used according to one embodiment of the invention and the compound B-235 which acts as a crosslinking and/or grafting agent, optionally together with the further monoethylenically unsaturated monomer B-236, in an aqueous emulsion in a manner known per se at temperatures between 20° C. and 120° C., preferably between 50° C. and 110° C. The customary emulsifiers may be employed. In accordance with one embodiment the emulsifiers are employed in amounts of from 0.5 to 5 wt %, in particular from 0.7 to 2 wt %, based on the monomers employed in the preparation of the substrate B22. The weight ratio of water to monomers is generally in the range of from 4:1 to 0.6:1. Suitable polymerization initiators include particularly the commonly used persulfates, for example potassium persulfate. However, it is also possible to use redox systems. The initiators are generally employed in amounts of from 0.1 to 1 wt % based on the monomers used in the production of the substrate B22. Further polymerization assistants that may be used in the polymerization include the customary buffer substances used to adjust the pH to the preferred range of from 6 to 9, such as sodium bicarbonate and sodium pyrophosphate, and also from 0 to 3 wt % of a molecular weight regulator, such as mercaptans, terpinols or dimeric α-methylstyrene.

The precise polymerization conditions, in particular emulsifier type, feed modus and quantity, are specifically determined within the above-specified ranges such that the obtained latex of the crosslinked acrylic ester polymer B23 has a d50 value in the range of from 800 to 950 nm, preferably from 825 to 925 nm, often from 850 to 900 nm. The particle size distribution of this latex shall preferably be narrow, with a polydispersity index <0.75.

To form the graft polymer B2, one embodiment of the invention may comprise a subsequent step wherein in presence of the thus obtained latex of the crosslinked acrylic ester polymer B23 a monomer mixture of component B-241, preferably styrene, component B-242, preferably acrylonitrile and/or a (meth)acrylic ester, and optionally further unsaturated monomers is polymerized. Monomers B-241, B-242 and optionally further unsaturated monomers may be added to this polymerization individually or in admixture with one another. For example it is possible to initially graft styrene alone and subsequently graft a mixture of styrene and acrylonitrile. It is advantageous to again carry out this graft copolymerization onto the crosslinked acrylic ester polymer serving as the graft substrate in aqueous emulsion under the customary conditions as described above. The graft copolymerization may advantageously be performed in the same system as the emulsion polymerization for producing graft substrate B23 and further emulsifier and initiator may be added if necessary.

The monomer mixture to be grafted onto the graft substrate according to one embodiment of the invention may be added to the reaction mixture all at once, batchwise in a plurality of stages (for example to construct a plurality of graft superstrates) or preferably in continuous fashion during the polymerization. The graft copolymerization of the mixture of the components B-241, B-242 and optionally further monomers in the presence of the crosslinking acrylic ester polymer B23 is conducted such that a degree of grafting of from 10 to 70 wt %, preferably 20 to 60 wt %, in particular 30 to 55 wt %, based on the total weight of component B2, is achieved in graft copolymer B2. Since the grafting yield of the graft copolymerization is never 100%, a somewhat larger amount of the monomer mixture of B-241, B-242 and optionally further monomers should advantageously be used in the graft copolymerization than corresponds to the desired degree of grafting.

Controlling the graft yield in the graft copolymerization and thus the degree of grafting of the finished graft copolymer B2 is familiar to those skilled in the art and may, for example, be accomplished inter alia via the feed rate of the monomers or via addition of regulators (Chauvel, Daniel, ACS Polymer Preprints 15 (1974), pages 329 to 333). The emulsion graft copolymerization generally affords from 5 to 15 wt %, based on the graft copolymer, of free, ungrafted copolymer of the components B-241, B-242 and optionally of the further monomers.

The proportion of the graft copolymer B2 in the polymerization product obtained in the graft copolymerization may be determined, for example, by the method described in US 2004/0006178.

The graft copolymers B according to the invention may be further used as they are obtained in the reaction mixture, for example as a latex emulsion or dispersion. Alternatively they may also be worked up in a further step, this being preferable for most applications. Workup measures are known to those skilled in the art. Said measures include, for example, graft copolymers B being isolated from the reaction mixture, for example by spray drying, shearing or by precipitation with strong acids or using nucleating agents, such as inorganic compounds, for example magnesium sulfate. However, the graft copolymers B present in the reaction mixture may also be worked up from the reaction mixture by complete or partial dewatering. It is likewise possible to work up using a combination of the cited measures.

The mixing of the components A and B to form the molding compound may be effected in any desired manner by any known methods. When these components have been formed by emulsion polymerization, for example, it is possible to mix the obtained polymer dispersions with one another and then to conjointly precipitate the polymers and to work up the polymer mixture. Preferably, however, these components are blended by being conjointly extruded, kneaded or rolled, the components having been isolated beforehand as necessary from the as-polymerized solution or aqueous dispersion. The graft copolymerization products B obtained in aqueous dispersion may also be de-watered only partially and mixed in the form of moist crumb with the hard matrix A, in which case the graft copolymers B then dry completely during the mixing.

In further embodiments of the processes according to the invention the graft substrates B11 and B21 may be produced in the presence of seed particles.

Seed particles generally have a particle size d50 of from 10 to 200 nm, preferably 10 to 180 nm, more preferably 10 to 160 nm. It is preferable to employ seed particles having a low particle size distribution width. Among these, seed particles having a monomodal particle size distribution are particularly preferred. The seed particles may in principle be constructed from monomers that form elastomeric polymers, for example acrylates, or from a polymer having a glass transition temperature higher than 0° C., preferably higher than 25° C.

The preferred monomers on which these seed particles are based include vinylaromatic monomers such as styrene, ring-substituted styrenes or alpha-methylstyrene, including preferably styrene, acrylonitrile, alkylacrylic acid, alkyl acrylates, including preferably n-butyl acrylate. Mixtures of two or more, preferably two, of the cited monomers are also useful. Seed particles made of polystyrene or n-butyl acrylate are very particularly preferred. The preparation of seed particles of this type is known to those skilled in the art or may be carried out according to methods that are known per se.

The seed particles are preferably obtained by particle-forming heterogeneous polymerization processes, preferably by emulsion polymerization. The seed particles are initially charged according to the present invention and the seed particles may initially be separately produced and worked up, and then employed. However, it is also possible to produce the seed particles and then add them to the monomer mixture composed of B-111, B-112 and optionally B-113, or B-211, B-212 or B-213, without prior workup.

One method of characterizing the extent of the crosslinking in crosslinked polymer particles is to measure the swelling index SI which is a measure of the swellability of a more or less crosslinked polymer with a solvent. Examples of customary swelling agents include methyl ethyl ketone and toluene. The SI for graft copolymer B of the molding compounds according to the invention is typically in the range SI=10 to 60. Preference is given to an SI of 6 to 18, more preferably of 7 to 15 in toluene.

To determine the swelling index, an aqueous dispersion of a graft copolymer B1 or B2 is dried at 80° C. overnight on a metal sheet under slightly reduced pressure (600 to 800 mbar) and a nitrogen atmosphere. A 1 cm2 slice is then cut off from the resulting 2 mm-thick film and swelled overnight in 50 ml of toluene (or methyl ethyl ketone) in a penicillin bottle. The supernatant toluene is removed by suction, and the swelled film is weighed and dried at 80° C. overnight. The weight of the dried film is determined. The swelling index is calculated by dividing the weight of the swelled gel by the weight of the dried gel.

Component C:

In addition to the copolymer components A and B the molding compounds according to the invention often contain one or more added substances/additives distinct from components A and B and typically and commonly employed in plastics material mixtures.

Examples of such added substances/additives include: colorants, pigments, dyes, antistats, antioxidants, stabilizers to improve thermal stability, to improve UV-resistance, to enhance hydrolysis resistance and chemical resistance, agents against thermal decomposition and in particular the lubricants/glidants that are useful for production of molded bodies/articles. These further added substances may be admixed at any stage of the manufacturing operation, but preferably at an early stage in order to profit early on from the stabilizing effects (or other specific effects) of the added substances. Heat stabilizers and oxidation retarders are typically metal halides (chlorides, bromides, iodides) and are derived from metals of group I of the Periodic Table (such as Li, Na, K, Cu).

Stabilizers suitable as component C include the customary hindered phenols, but also "vitamin E" and/or similarly constructed compounds. Benzophenones, resorcinols, salicylates, benzotriazoles and other compounds are also suitable. These are typically used in amounts of from 0 to 2 wt %, preferably 0.01 to 2 wt % (based on the total weight of the molding compounds according to the invention).

Suitable gliding and demolding agents include stearic acids, stearyl alcohol, stearic esters and/or generally higher fatty acids, derivatives thereof and corresponding fatty acid mixtures comprising 12 to 30 carbon atoms. The amounts of these additions—if present—are in the range of from 0.05 to 1 wt % (based on the total weight of the molding compounds according to the invention).

Useful added substances further include silicone oils, oligomeric isobutylene or similar substances and typical amounts—if present—are from 0.05 to 5 wt % (based on the total weight of the molding compounds according to the present invention). Pigments, colorants, color brighteners, such as ultramarine blue, phthalocyanines, titanium dioxide, cadmium sulfides, derivatives of perylenetetracarboxylic acid may likewise be used.

Processing aids and stabilizers, lubricants and antistats are typically used in amounts of from 0 to 2 wt %, preferably 0.01 to 2 wt % (based on the total weight of the molding compounds according to the present invention).

The molding compounds according to the invention may be used in a range of matt extrusion applications but in particular in coextruded house claddings and window frames on polyvinyl chloride (PVC) or acrylonitrile butadiene styrene (ABS). The molding compound according to the invention has a film thickness between 50-200 μm in the coextrusion.

The PVC used in these coextruded applications may be admixed with rubbers, fillers, such as calcium carbonate, processing aids, colorants, such as titanium dioxide, UV additives and recyclate.

Coextrusion is preferably carried out at temperatures below 250° C., more preferably at temperatures of the inventive molding compounds between 200-230° C.

The examples and claims which follow further elucidate the invention.

EXAMPLES

Test Methods:

The puncture energy was determined according to ISO 6603 for 100 μm-thick films/sheets on 80 mm-thick disks at 23° C. and 50% relative humidity. The test velocity was 4 m/s and the puncture energy was 153.7 J.

Surface gloss of all samples was measured according to DIN 67530 at a 60° viewing angle.

Transmission was determined using a PerkinElmer Lambda 900 UV/VIS/NIR spectrophotometer with a 150 mm Ulbricht sphere.

Materials Used:

Components or products with the prefix "V-" are noninventive and are used for comparison.

The following were used as component A (or V-A for comparison):

A-i: a styrene-acrylonitrile copolymer comprising 65 wt % of styrene and 35 wt % of acrylonitrile and having a viscosity number of 80 ml/g (determined in 0.5 wt % DMF solution at 25° C.) and a Mw of 104 000 (determined by SEC-MALLS).

A-ii: a styrene-acrylonitrile copolymer comprising 65 wt % of styrene and 35 wt % of acrylonitrile and having a viscosity number of 60 ml/g (determined in 0.5 wt % DMF solution at 25° C.) and a Mw of 82 000 (determined by SEC-MALLS).

V-A-iii: Luran S 797 SE UV ASA (a UV-stabilized ASA thermoplast having an E-modulus of about 2000 MPa according to ISO 527) as per EP-A 1 044 241.

The following were used as components B (or V-B for comparison):

B-i: Fine-particle rubber
  produced in accordance with EP-A-450 485 where this rubber is described as an inventive example of the fine-particle graft copolymer A. For component B-1 the synthesis was performed using 2 parts of dihydrodicyclopentadienyl acrylate (DCPA) instead of two parts of tricyclodecenyl acrylate:

B-i1 2508g of water were heated with stirring to 65° C. in admixture with 42.5 g of the potassium salt of a C12 to C18 paraffin sulfonic acid and 7 g of sodium hydrogencarbonate. 5 g of potassium persulfate were then added. 1670 g of butyl acrylate and 34 g of dihydrodicyclopentadienyl acrylate (CAS number 12542-30-2) were added over 3.5 hours. Afterwards, the mixture was left for a further two hours and cooled to RT. The latex obtained had a solids content of 39.8 wt %. The average particle size was determined as 80.1 nm. The particle size distribution was narrow (quotient Q=0.32).

B-i2 2110g of pieces of the latex obtained according to B-i1 were heated to 65° C. with 1330 g of water. 2.5 g of potassium persulfate were added and 560 g of styrene and acrylonitrile (weight ratio of 75:25) were added over 3 hours with stirring and the dispersion was then left for 2 hours. The dispersion was subsequently precipitated with calcium chloride solution at 95° C. and the solid was separated off, washed with water and dried in a stream of warm air. The average particle size of B-i2 was determined as 94 nm.

B-ii: Coarse-Particle Rubber:

B-ii1 2856 g of water, 41 g of the latex obtained according to B-i1 and 5 g of sodium hydrogencarbonate were heated with stirring to 85° C. 0.2 g of potassium persulfate were then added. 66.5 g of styrene and 0.2 g of allyl methacrylate (CAS number 96-05-9) were subsequently added over 10 min, the mixture was left for 45 min and then 1.3 g of potassium persulfate were added. 1263.5 g of styrene and 3.8 g of allyl methacrylate were then added over 2 hours and 20 g of a potassium salt of a C12 to C18 paraffin sulfonic acid in 250 g of water were added over 3 hours. 1.3 g of potassium persulfate were also added during each of these additions, after 2 hours and after 3 hours respectively. Once the addition of the potassium salt of a C12 to C18 paraffin sulfonic acid was complete, the reaction was left for 2 h and cooled to RT. The latex obtained had a solids content of 30.1 wt %. The average particle size was determined as 345 nm. The particle size distribution was narrow (quotient Q=0.18).

B-ii2 2011 g of water were heated with stirring to 65° C. with 481 g of the latex obtained according to B-ii1 and 6.7 g of sodium hydrogencarbonate. Subsequently, 5.3 g of potassium persulfate were immediately added and 1777 g of butyl acrylate and 2.7 g of allyl methacrylate were added over 3.5 hours and 30 g of the potassium salt of a C12 to C18 paraffin sulfonic acid in 500 g of water were added over 3.25 hours. Following addition of the butyl acrylate and allyl methacrylate the reaction was then left for 2 hours and cooled to RT. The latex obtained had a solids content of 39.6 wt %. The average particle size was determined as 870 nm. The particle size distribution was narrow (quotient Q=0.12).

B-ii3 4685 g of pieces of the latex obtained according to B-ii2 were heated to 60° C. with 2905 g of water and 8.4 g of the potassium salt of a C12 to C18 paraffin sulfonic acid. Subsequently, 5 g of potassium persulfate were added, 41 g of styrene were added over 1 hour and then 835 g of styrene and acrylonitrile (weight ratio of 75:25) were added with stirring over 2 hours. The dispersion was subsequently left for 2 hours and cooled to RT. The dispersion was subsequently precipitated with calcium chloride solution at 95° C. and the solid was separated off, washed with water and dried in a stream of warm air. The swelling index of B-ii was determined as 8.3 in toluene and the average particle size of B-ii was 1051 nm. The particle size distribution was narrow (quotient Q=0.12).

V-B-iii: A particulate graft polymer composed of poly-n-butyl acrylate (core) and styrene/acrylonitrile copolymer (shell) as per DE 195 36 892.

1230 g of water were admixed under a nitrogen atmosphere with 8.6 g of Na2HPO4 dodecahydrate and 3.2 g of NaH2PO4 as a buffer system, 1.6 g of dilauroyl peroxide, 100 g of polyvinyl alcohol solution (Mw=130 000 g), 600 g of n-butyl acrylate and 9 g of dihydrodicyclopentadienyl acrylate. The mixture was vigorously stirred for 40 min and heated to 73° C. This causes monomer droplets to form. The mixture was transferred into a different vessel and heated therein to 87° C. under moderate stirring for 2 hours. 280 g of styrene, 120 g of acrylonitrile, 0.5 g of tertiary-butyl perpivalate and 0.5 g of 2-ethylhexylthioglycolate were then added over 10 minutes with moderate stirring at 70° C. The reaction mixture was left at 70° C. for 2 hours and subsequently brought up to 85° C. for 2 hours.

The particles of the graft polymer thus obtained had a particle diameter of 9.4 μm as determined by Fraunhofer diffraction.

V-B-iv: A particulate microsuspension polymer composed of poly-n-butyl acrylate (core) and styrene/acrylonitrile copolymer (shell) as per DE 195 36 892.

1230 g of water, 200 g of a 10% Mowiol® 8-88 solution in water (obtained from Sigma Aldrich), 50 g of n-butyl acrylate, 1 g of dihydrodicyclopentadienyl acrylate and 0.4 g of dilauryl peroxide were initially charged under a nitrogen atmosphere and polymerization was commenced at 75° C. and 7200 rpm with a Janke & Kunkel Ultra Turrax T65 S5 instrument. 930 g of n-butyl acrylate, 19 g of dihydrodicyclopentadienyl acrylate and 7.6 g of dilauryl peroxide were further polymerized over 200 min at 7000 rpm and polymerization was subsequently run to completion over 60 min. A further 617 g of water and 551 g of a 10% Mowiol® 8-88 solution in water were added to the batch followed by addition of 1033 g of styrene and 345 g of acrylonitrile over a period of 140 min at 75° C. The average particle size was determined as 2.8 µm.

V-B-v: A particulate graft polymer composed of poly-n-butyl acrylate, the acrylic ester of tricyclodecenyl alcohol and 2-hydroxyethyl acrylate in the core and styrene, acrylonitrile and dimethylaminoethyl acrylate in the shell as per DE 42 42 485.

1500 g of water, 154.4 g of n-butyl acrylate, 3.2 g of dihydrodicyclopentadienyl acrylate, 1.5 g of 2-hydroxyethyl acrylate, 5 g of the sodium salt of a C12-C18 paraffin sulfonic acid, 3 g of potassium peroxodisulfate, 3 g of sodium hydrogencarbonate and 1.5 g of sodium pyrophosphate were heated to 60° C. with stirring. A further 810.6 g of n-butyl acrylate, 16.8 g of dihydrocyclopentadienyl acrylate and 12.6 g of 2-hydroxyethyl acrylate were added over 3 hours at 60° C. and polymerization was subsequently run to completion over one hour at 60° C.

The emulsion produced was mixed with 1150 g of water and 2.7 g of potassium peroxodisulfate and heated to 65° C. with stirring. 418.3 g of styrene, 134.4 g of acrylonitrile and 7.3 g of dimethylaminoethyl acrylate were added over 3 hours and polymerization was run to completion over a further 2 hours at 65° C. The graft polymer precipitated out of the emulsion with calcium chloride solution at 95° C. and the solid was washed with water and dried in a stream of warm air.

The following were used as component C (or V-C for comparison):

C-i: Commercially available Kronos 2220 titanium dioxide.
C-ii: a compound of formula (I) commercially marketed by BASF SE as Tinuvin® 770 in a concentration of 0.45% and a compound of formula (II) commercially marketed by BASF SE as Tinuvin® P in a concentration of 0.45%.

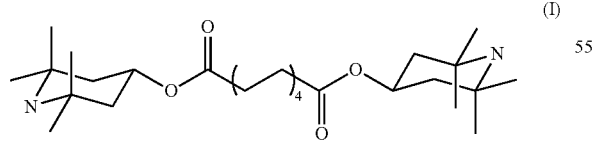

(I)

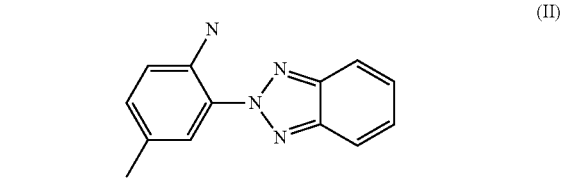

(II)

V-C-iii: Polybutylene terephthalate (PBT) having a viscosity number of 109 ml/g measured in phenol/o-dichlorobenzene (1:1) according to ISO 1628-1.

Producing the molding compounds and molded bodies:

The components A, B and C (see table 1 for respective parts by weight) were homogenized at 280° C. in a twin-screw extruder (Werner & Pfleiderer ZSK30) and extruded into a water bath.

The extrudates were pelletized and dried. The pellets were used to produce a 100 µm±5 µm film/sheet on a twin-screw extruder (Haake ZSK25) at a melt temperature of 250° C. and the properties reported in Table 1 were determined.

TABLE 1

Composition and properties of the molding compounds (prefixed V: for comparison)

| Composition | Example |  |  |  |  |  |  |  |  |
|---|---|---|---|---|---|---|---|---|---|
|  | 1 | 2 | 3 | 4 | 5 | V-6 | V-7 | V-8 | V-9 |
| A-i | 65 | 62 | 61 | 65 |  |  | 50 | 62 | 70 |
| A-ii |  |  |  |  | 60 |  |  |  |  |
| V-A-iii |  |  |  |  |  | 92.8 |  |  |  |
| B-i | 17.5 | 17.5 | 17.5 | 14 | 20 |  | 40 |  |  |
| B-ii | 17.5 | 17.5 | 17.5 | 21 | 20 |  |  |  |  |
| V-B-iii |  |  |  |  |  |  | 10 |  |  |
| V-B-iv |  |  |  |  |  |  |  | 48 |  |
| V-B-v |  |  |  |  |  |  |  |  | 30 |
| C-i |  | 3 | 3 |  |  | 2.6 |  |  |  |
| C-ii |  |  | 1 |  |  |  |  |  |  |
| V-C-iii |  |  |  |  |  | 4.6 |  |  |  |
| Puncture energy [J/mm] | 9 | 7 | 7 | 8 | 9 | 4 | 3 | 4 | 4 |
| Gloss [%] | 22 | 21 | 21 | 20 | 20 | 25 | 24 | 35 | 47 |
| Transmission at 550 nm [%] | 65 | 27 | 28 | 61 | 63 | 22 | 35 | 42 | 53 |

The examples reported in the table verify that the molding compounds according to the invention show improved puncture properties compared to the known ASA molding compounds coupled with low gloss and good transmission (improved colorability) without colorant (such as titanium dioxide). The respective compositions are reported in parts by weight.

The invention claimed is:

1. A thermoplastic composition comprising the following components:
   a) 30 to 90 wt % of one or more styrene copolymers composed of styrene and/or α-methylstyrene and of acrylonitrile and optionally further monomers, as component A;
   b) 10 to 70 wt % of a plurality of impact-modifying graft rubbers without olefinic double bonding in the rubber phase, as component B, wherein said component B comprises:
      B1) 1 to 50 wt % of graft rubber particles having an average particle diameter of from 50 to 150 nm, as graft rubber component B1;
      B2) 50 to 99 wt % of graft rubber particles having an average particle diameter of from 800 to 1200 nm, as graft rubber component B2; and
   c) 0 to 20 wt % of one or more added substances distinct from component A, graft rubber component B1, and graft rubber component B2, as component C;
with the proviso that the weight percent values are in each case based on the total weight of the components A, B, and C and said components altogether sum to 100 wt %, wherein the graft rubber component B2 employed is an acrylate-styrene-acrylonitrile (ASA) graft copolymer comprising as the polymeric substrate an acrylic ester polymer B21 and which comprises at least three different polymeric superstrates B22, B23, and B24,
wherein the first polymeric superstrate B22 is formed from a vinylaromatic monomer and optionally a polar, copolymerizable, ethylenically unsaturated monomer,
the second polymeric superstrate B23 is formed from at least one acrylate monomer, and
the third polymeric superstrate B24 is formed from a vinylaromatic monomer and at least one polar, copolymerizable, ethylenically unsaturated monomer.

2. The thermoplastic composition according to claim 1, characterized in that the following components are employed:
a) 50 to 80 wt % of one or more styrene copolymers composed of styrene and/or α-methylstyrene and of acrylonitrile, as component A;
b) 20 to 50 wt % of a plurality of impact-modifying graft rubbers without olefinic double bonding in the rubber phase, as component B, wherein said component B comprises:
B1) 10 to 50 wt % of graft rubber particles having an average particle diameter of from 50 to 150 nm, as graft rubber component B1;
B2) 50 to 90 wt % of graft rubber particles having an average particle diameter of from 800 to 1200 nm, as graft rubber component B2; and
c) 0 to 20 wt % of one or more added substances distinct from component A, graft rubber component B1, and graft rubber component B2, as component C.

3. The thermoplastic composition according to claim 1, characterized in that the following components are employed:
a) 50 to 80 wt % of one or more styrene copolymers composed of styrene and/or α-methylstyrene and of acrylonitrile, as component A;
b) 20 to 50 wt % of a plurality of impact-modifying graft rubbers without olefinic double bonding in the rubber phase, as component B, wherein said component B comprises:
B1) 10 to 50 wt % of graft rubber particles having an average particle diameter of from 80 to 120 nm, as graft rubber component B1;
B2) 50 to 90 wt % of graft rubber particles having an average particle diameter of from 900 to 1200 nm, as graft rubber component B2; and
c) 0 to 20 wt % of one or more added substances distinct from component A, graft rubber component B1, and graft rubber component B2, as component C.

4. The thermoplastic composition according to claim 1, characterized in that the component A employed is a styrene copolymer composed of:
55 to 90 wt % of styrene and/or α-methylstyrene,
10 to 45 wt % of acrylonitrile, and
0 to 10 wt % of further monomers,
with the proviso that the weight percent values are in each case based on the total weight of the component A.

5. The thermoplastic composition according to claim 1, characterized in that the component A employed is a copolymer composed of styrene and acrylonitrile and the graft rubber component B1 employed is an acrylate-styrene-acrylonitrile (ASA) graft copolymer which comprises as the polymeric substrate an acrylic ester polymer B11 and which comprises a polymeric superstrate B12, wherein the superstrate is formed from a vinylaromatic monomer and a polar, copolymerizable, ethylenically unsaturated monomer.

6. The thermoplastic composition according to claim 1, characterized in that the graft rubber component B1 is produced by emulsion polymerization.

7. The thermoplastic composition according to claim 1, characterized in that the graft rubber component B1 is present in an amount of from 10 to 20 wt % and the graft rubber component B2 is present in an amount of from 10 to 40 wt %, in each case based on the total weight of the components A, B, and C.

8. The thermoplastic composition according to claim 1, characterized in that the average particle diameter of the graft rubber component B1 is between 90 to 110 nm.

9. The thermoplastic composition according to claim 1, characterized in that the average particle diameter of the graft rubber component B2 is between 950 to 1100 nm.

10. The thermoplastic composition according to claim 1, characterized in that both graft rubber components B1 and B2 employ as the substrate an alkyl acrylate comprising $C_1$ to C8 alkyl radicals, and at least one monomer which has crosslinking properties and is selected from the group: butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, diallyl phthalate, allyl methacrylate, and dihydrodicyclopentadienyl acrylate.

11. The thermoplastic composition according to claim 1, characterized in that styrene is employed as the vinylaromatic component for the first polymeric superstrate B22 or the second polymeric superstrate B23 and that an alkyl acrylate comprising $C_1$ to C8 alkyl radicals, and at least one monomer which has crosslinking properties and is selected from the group: butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, diallyl phthalate, allyl methacrylate, and dihydrodicyclopentadienyl acrylate, are employed for the first polymeric superstrate B22 or the second polymeric superstrate B23, and optionally the monomers styrene and acrylonitrile are employed for the third polymeric superstrate B24 of graft rubber component B2.

12. The thermoplastic composition according to claim 1, wherein the acrylic ester polymer B21 is composed of butyl acrylate and of a monomer which has crosslinking properties and is selected from the group: butylene diacrylate, divinylbenzene, butanediol dimethacrylate, trimethylolpropane tri (meth)acrylate, diallyl methacrylate, diallyl maleate, diallyl fumarate, triallyl methacrylate, triallyl isocyanurate, diallyl phthalate, allyl methacrylate, and dihydrodicyclopentadienyl acrylate, and wherein the first polymeric superstrate B22 is formed from styrene and a monomer which has crosslinking properties and is selected from the abovementioned group and the second polymeric superstrate B23 is formed from butyl acrylate and a monomer which has crosslinking properties and is selected from the abovementioned group and the third polymeric superstrate B24 is formed from styrene and acrylonitrile.

13. The thermoplastic composition according to claim 1, characterized in that the employed weight ratio of graft rubber component B1 to graft rubber component B2 is from 2:1 to 1:2 and the employed weight ratio of styrene copolymer component A to graft rubber component B1 is from 4:1 to 4:3.

14. A process for producing a thermoplastic composition according to claim 1, characterized in that it comprises producing the styrene copolymer components A by solution polymerization or bulk polymerization, producing the graft copolymer components B by emulsion polymerization, and mixing the components A and B and optionally C with one another in any desired order at temperatures of from 100° C. to 300° C. and a pressure of from 1 to 50 bar and then extruding the mixture.

15. A method for producing films/sheets, molded bodies, or composite articles, wherein the thermoplastic composition according to claim 1 is extruded.

16. A film/sheet, molded body, or composite article comprising a thermoplastic composition according to claim 1.

17. A process for producing composite articles from at least one layer composed of a thermoplastic composition according to claim 1 and at least one layer made of PVC or ABS, wherein the thermoplastic composition according to claim 1 is coextruded on the PVC or the ABS.

18. A composite article composed of at least one layer made of a thermoplastic com-position according to claim 1 and at least one layer made of PVC or ABS.

19. An architectural cladding comprising at least one composite article of claim 18.

* * * * *